United States Patent
Ieva et al.

(10) Patent No.: US 10,138,161 B2
(45) Date of Patent: Nov. 27, 2018

(54) PROCESS FOR MANUFACTURING FLUOROPOLYMER COMPOSITES

(71) Applicant: SOLVAY SPECIALTY POLYMERS ITALY S.P.A., Bollate (IT)

(72) Inventors: Eliana Ieva, Alessandria (IT); Rui Liu, Gerenzano (IT); Elisabetta Sartirana, Pavia (IT)

(73) Assignee: SOLVAY SPECIALTY POLYMERS ITALY S.P.A., Bollate (MI) (IT)

( * ) Notice: Subject to any disclaimer, the term of this patent is extended or adjusted under 35 U.S.C. 154(b) by 128 days.

(21) Appl. No.: 14/895,296

(22) PCT Filed: May 29, 2014

(86) PCT No.: PCT/EP2014/061204
§ 371 (c)(1),
(2) Date: Dec. 2, 2015

(87) PCT Pub. No.: WO2014/195225
PCT Pub. Date: Dec. 11, 2014

(65) Prior Publication Data
US 2016/0122241 A1    May 5, 2016

(30) Foreign Application Priority Data

Jun. 4, 2013 (EP) .................... 13170413

(51) Int. Cl.
| | | |
|---|---|---|
| *C08J 5/04* | (2006.01) | |
| *C03C 25/305* | (2018.01) | |
| *B29B 15/12* | (2006.01) | |

(52) U.S. Cl.
CPC .......... *C03C 25/305* (2013.01); *B29B 15/125* (2013.01); *C08J 5/043* (2013.01);
(Continued)

(58) Field of Classification Search
CPC ......................................... C08J 5/04
(Continued)

(56) References Cited

U.S. PATENT DOCUMENTS

| | | |
|---|---|---|
| 3,242,218 A | 3/1966 | Miller et al. |
| 3,665,041 A | 5/1972 | Sianesi et al. |

(Continued)

FOREIGN PATENT DOCUMENTS

| | | |
|---|---|---|
| CA | 786877 A | 6/1968 |
| EP | 0148482 B1 | 3/1992 |

(Continued)

*Primary Examiner* — Cachet I Sellman

(57) ABSTRACT

The present invention pertains to a process for manufacturing a fluoropolymer composite, said process comprising the following sequential steps: (i) providing an aqueous latex comprising from 10% to 40% by weight, preferably from 15% to 35% by weight of at least one fluoropolymer comprising recurring units derived from vinylidene fluoride (VDF) [polymer (VDF)]; (ii) up-concentrating the aqueous latex provided in step (i) thereby providing an up-concentrated aqueous latex comprising from 45% to 60% by weight, preferably from 45% to 55% by weight of at least one polymer (VDF); (iii) contacting one continuous fiber or a bunch of continuous fibers with the up-concentrated aqueous latex provided in step (ii); (iv) squeezing the impregnated fibrous material provided in step (iii); (v) drying the squeezed fibrous material provided in step (iv), typically at a temperature comprised between 100° C. and 120° C.; (vi) baking the dried fibrous material provided in step (v) at a temperature comprised between 190° C. and 240° C.; (vii) cooling the coated fibrous material provided in step (vi), preferably to a temperature of about 20° C.; (viii) optionally, contacting the coated fibrous material provided in step (vii) with the up-concentrated aqueous latex provided in step (ii) and submitting the impregnated fibrous material so provided to sequential steps (iv) to (vii); and (ix) optionally, repeating (Continued)

step (viii) one or more times. The present invention also pertains to the fluoropolymer composite thereby provided and to uses of said fluoropolymer composite in various applications.

19 Claims, 1 Drawing Sheet

(52) U.S. Cl.
CPC .... *C03C 2217/78* (2013.01); *C03C 2218/111* (2013.01); *C03C 2218/32* (2013.01); *C08J 2327/16* (2013.01)

(58) Field of Classification Search
USPC .......................................... 427/434.6, 434.2
See application file for complete search history.

(56) References Cited

U.S. PATENT DOCUMENTS

| | | | |
|---|---|---|---|
| 3,715,378 A | | 2/1973 | Sianesi et al. |
| 4,328,151 A | * | 5/1982 | Robinson ............... C08J 3/226 |
| | | | 264/127 |
| 4,523,039 A | | 6/1985 | Lagow et al. |
| 4,618,641 A | * | 10/1986 | Hengel ................. C08F 6/20 |
| | | | 524/284 |
| 4,670,503 A | * | 6/1987 | Neumann ............ C09D 127/16 |
| | | | 524/300 |
| 4,731,283 A | | 3/1988 | Sakane et al. |
| 4,864,006 A | * | 9/1989 | Giannetti ................ C08F 14/18 |
| | | | 526/206 |
| 4,990,283 A | | 2/1991 | Visca et al. |
| 5,194,484 A | | 3/1993 | Logothetis |
| 5,498,680 A | | 3/1996 | Abusleme et al. |
| 6,103,843 A | | 8/2000 | Abusleme et al. |
| 6,720,381 B1 | * | 4/2004 | Tomihashi .............. C08L 27/12 |
| | | | 252/511 |
| 6,833,403 B1 | | 12/2004 | Blädel et al. |
| 6,998,434 B2 | * | 2/2006 | Wadahara .............. B82Y 30/00 |
| | | | 252/500 |
| 7,122,608 B1 | | 10/2006 | Brinati et al. |
| 7,671,112 B2 | * | 3/2010 | Hintzer ................... C08L 27/12 |
| | | | 523/310 |
| 2006/0151391 A1 | | 7/2006 | Nakaya et al. |
| 2010/0203328 A1 | | 8/2010 | Hochstetter et al. |
| 2011/0166278 A1 | * | 7/2011 | Hochstetter ......... D06M 15/256 |
| | | | 524/404 |

FOREIGN PATENT DOCUMENTS

| | | | | |
|---|---|---|---|---|
| EP | 1229091 A2 | * | 8/2002 | ............. C08L 27/12 |
| EP | 1229091 A2 | | 8/2002 | |
| EP | 1489104 A1 | | 12/2004 | |
| EP | 1574527 A1 | | 9/2005 | |
| EP | 1584632 A1 | | 10/2005 | |
| GB | 997096 A | | 6/1965 | |
| GB | 1226566 A | | 3/1971 | |
| JP | 61123646 A | | 6/1986 | |
| JP | 62189153 A | | 8/1987 | |
| JP | 02222439 A | | 9/1990 | |
| JP | 2006522836 A | | 10/2006 | |
| WO | 8700538 A1 | | 1/1987 | |
| WO | 2004067656 A1 | | 8/2004 | |
| WO | 2005003190 A1 | | 1/2005 | |
| WO | 2007116037 A1 | | 10/2007 | |

* cited by examiner

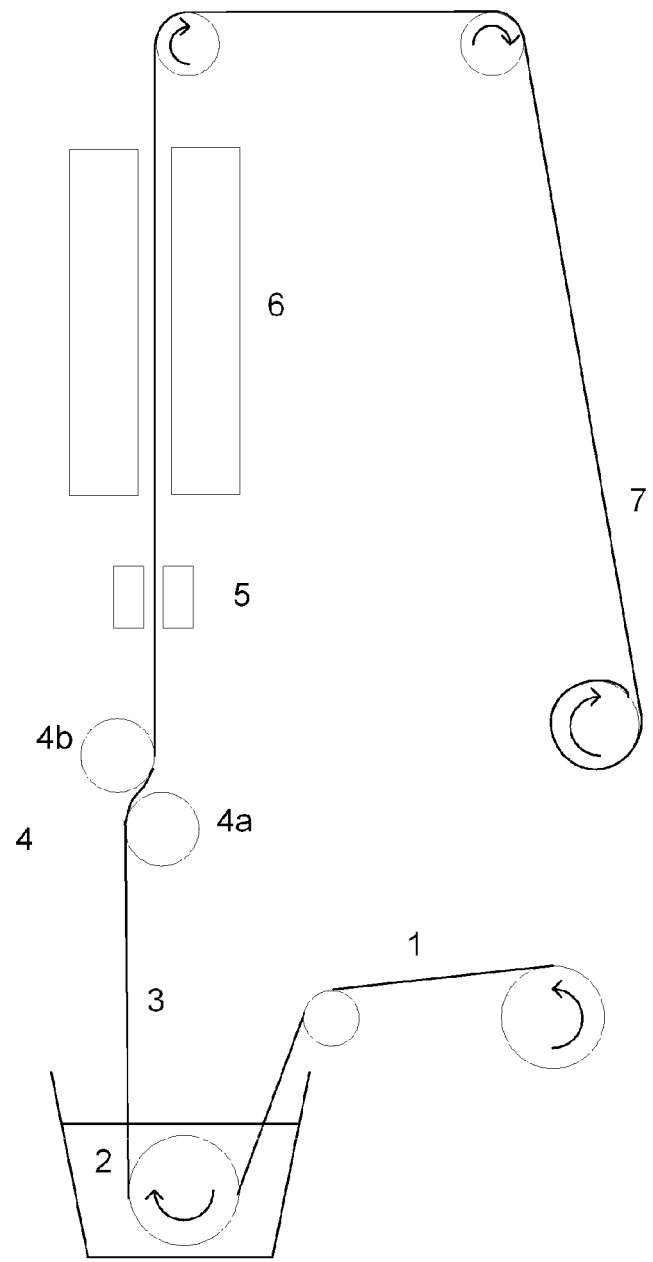

PROCESS FOR MANUFACTURING FLUOROPOLYMER COMPOSITES

This application is a U.S. national stage entry under 35 U.S.C. § 371 of International Application No. PCT/EP2014/061204 filed May 29, 2014, which claims priority to European application No. 13170413.2 filed on Jun. 4, 2013. The entire contents of these applications are explicitly incorporated herein by this reference.

TECHNICAL FIELD

The present invention pertains to a process for manufacturing a fluoropolymer composite, to the fluoropolymer composite thereby provided and to uses of said fluoropolymer composite in various applications.

BACKGROUND ART

Polymer composites containing a fluoropolymer and reinforcing fibres are known in the art. The fluoropolymer composites so obtained are advantageously endowed with good thermomechanical strength and chemical resistance to be suitably used in a variety of applications.

The coating of the fibres by the fluoropolymer matrix may be carried out according to various techniques, depending on the physical form of the matrix and of the fibres.

For instance, US 2010/0203328 (ARKEMA FRANCE) Aug. 12, 2010 discloses a process for impregnating continuous fibres comprising coating said fibres using a polymer matrix comprising at least one semicrystalline thermoplastic polymer having a glass transition temperature (Tg) less than or equal to 130° C. and nanotubes of at least one chemical element chosen from the elements from columns IIIa, IVa and Va of the Periodic Table. The coating of the fibres may be carried out according to a fluidized bed impregnation process, wherein the polymer matrix is in the powder form, or by passage of the fibres in an impregnating bath containing the polymer matrix in the melt state. As another variant, a film is prepared from the polymer matrix, especially by means of an extrusion or calendering process, then in placing it between two mats of fibres, the assembly being then hot-pressed in order to allow the impregnation of the fibres and the manufacture of the composite.

Also, U.S. Pat. No. 5,194,484 (E. I. DU PONT DE NEMOURS AND CO.) Mar. 16, 1993 discloses a process for making fluoropolymer composites comprising contacting a fibrous material with an aqueous fluoropolymer dispersion, precipitating the fluoropolymer from said dispersion to form a structure of fluoropolymer particles dispersed on said fibrous material, drying said structure and consolidating said structure by heating to a high enough temperature and applying sufficient pressure for a sufficient amount of time to form said structure into a solid shaped article.

In particular, poly(vinylidene fluoride) (PVDF) exhibits excellent toughness and corrosion resistance to severe environmental stresses, is thermally stable and resistant to creep at elevated temperatures and has a low permeability to gases and liquids, so that it offers great potential as a matrix for the development of fibre reinforced composites suitable for use in various applications including oil and gas applications.

However, dehydrofluorination of PVDF in the presence of strong bases represents one of the major issues encountered when compounding in the melt phase, under high pressures, fibres such as glass fibres with a vinylidene fluoride-based polymer matrix. When glass fibres are incorporated into said vinylidene fluoride-based polymer matrix by melt-processing techniques, more or less severe degradation of the vinylidene fluoride-based polymer takes place, depending on the composition of the glass, with formation of highly corrosive and highly toxic fumes of hydrogen fluoride.

There is thus still the need in the art for a process for impregnating a fibrous material enabling easy manufacture of vinylidene fluoride-based polymer composites and articles derived therefrom, said process providing fluoropolymer composites having high structural integrity and high adhesion at the fibre-fluoropolymer interface, while avoiding degradation phenomena adversely affecting the bulk properties of the fluoropolymer composites thereby provided.

SUMMARY OF INVENTION

In a first instance, the present invention pertains to a process for manufacturing a fluoropolymer composite, said process comprising the following sequential steps:

(i) providing an aqueous latex comprising from 10% to 40% by weight, preferably from 15% to 35% by weight of at least one fluoropolymer comprising recurring units derived from vinylidene fluoride (VDF) [polymer (VDF)];

(ii) up-concentrating the aqueous latex provided in step (i) thereby providing an up-concentrated aqueous latex comprising from 45% to 60% by weight, preferably from 45% to 55% by weight of at least one polymer (VDF);

(iii) contacting one continuous fibre or a bunch of continuous fibres with the up-concentrated aqueous latex provided in step (ii);

(iv) squeezing the impregnated fibrous material provided in step (iii);

(v) drying the squeezed fibrous material provided in step (iv), typically at a temperature comprised between 100° C. and 120° C.;

(vi) baking the dried fibrous material provided in step (v) at a temperature comprised between 190° C. and 240° C.;

(vii) cooling the coated fibrous material provided in step (vi), preferably to a temperature of about 20° C.;

(viii) optionally, contacting the coated fibrous material provided in step (vii) with the up-concentrated aqueous latex provided in step (ii) and submitting the impregnated fibrous material so provided to sequential steps (iv) to (vii); and (ix) optionally, repeating step (viii) one or more times.

The Applicant has found that a fluoropolymer composite having an outstanding structural integrity can be easily obtained by the process according to the invention at relatively low temperatures, by baking at a temperature advantageously comprised between 190° C. and 240° C., thus avoiding degradation of the polymer (VDF) in the fluoropolymer composite thereby provided, using an up-concentrated aqueous latex comprising a polymer (VDF) without the need of isolating powders therefrom.

The fluoropolymer composite provided by the process of the invention can be advantageously a fluoropolymer composite tape.

Thus, in a second instance, the present invention pertains to a process for manufacturing a fluoropolymer composite tape, said process comprising the following sequential steps:

(i) providing an aqueous latex comprising from 10% to 40% by weight, preferably from 15% to 35% by weight of at least one fluoropolymer comprising recurring units derived from vinylidene fluoride (VDF) [polymer (VDF)];

(ii) up-concentrating said aqueous latex thereby providing an up-concentrated aqueous latex comprising from 45% to 60% by weight, preferably from 45% to 55% by weight of at least one polymer (VDF);

(iii) contacting a fabric with the up-concentrated aqueous latex provided in step (ii);

(iv) squeezing the impregnated fabric provided in step (iii);

(v) drying the squeezed fabric provided in step (iv), typically at a temperature comprised between 100° C. and 120° C.;

(vi) baking the dried fabric provided in step (v) at a temperature comprised between 190° C. and 240° C.;

(vii) cooling the coated fabric provided in step (vi), preferably to a temperature of about 20° C.;

(viii) optionally, contacting the coated fabric provided in step (vii) with the up-concentrated aqueous latex provided in step (ii) and submitting the impregnated fabric so provided to sequential steps (iv) to (vii);

(ix) optionally, repeating step (viii) one or more times; and (x) collecting by rolling the coated fabric provided in any one of steps (vii) to (ix).

The process of the invention is advantageously a one-step coating process free from steps (viii) and (ix).

The process of the invention may also be a multi-step coating process comprising two or more coating steps.

Should the process of the invention be a multi-step coating process, the process for manufacturing a fluoropolymer composite further comprises step (viii) and, optionally, step (ix).

Should the process of the invention be a multi-step coating process, the process for manufacturing a fluoropolymer composite tape further comprises repeating step (viii) and, optionally, step (ix).

In a third instance, the present invention pertains to a fluoropolymer composite obtainable by the process of the invention.

The fluoropolymer composite of the present invention advantageously consists of at least one fluoropolymer [polymer (VDF)] distributed throughout one continuous fibre or a bunch of continuous fibres.

In a fourth instance, the present invention pertains to a fluoropolymer composite tape obtainable by the process of the invention.

The fluoropolymer composite tape of the present invention is advantageously a continuous strip of fabric wherein at least one fluoropolymer [polymer (VDF)] is distributed throughout said fabric.

It has been found that the fluoropolymer composite provided by the process of the invention advantageously exhibits outstanding adhesion between the fluoropolymer [polymer (VDF)] and the continuous fibres.

It has been found that the fluoropolymer composite provided by the process of the invention advantageously exhibits outstanding mechanical properties.

The Applicant thinks, without this limiting the scope of the invention, that by using a homogeneous up-concentrated aqueous latex, said up-concentrated aqueous latex comprising from 45% to 60% by weight, preferably from 45% to 55% by weight of at least one polymer (VDF), a fluoropolymer composite having a substantially uniform distribution of the polymer (VDF) throughout the continuous fibrous structure is obtained by the process of the invention.

The Applicant also thinks, without this limiting the scope of the invention, that by using a homogeneous up-concentrated aqueous latex, said up-concentrated aqueous latex comprising from 45% to 60% by weight, preferably from 45% to 55% by weight of at least one polymer (VDF), a fluoropolymer composite tape having a substantially uniform distribution of the polymer (VDF) throughout the fabric structure is obtained by the process of the invention.

It has been thus found that the fluoropolymer composite tape provided by the process of the invention has advantageously an outstanding structural integrity.

It has been also found that the process of the invention advantageously provides for a fluoropolymer composite tape having a coating of relatively high thickness at a relatively low number of coating steps.

The fluoropolymer composite tape provided by the process of the invention has typically a thickness of the coating comprised between 20 µm and 50 µm, preferably between 40 µm and 45 µm.

In a fifth instance, the present invention pertains to uses of the fluoropolymer composite or of the fluoropolymer composite tape obtainable by the process of the invention in various applications.

For the purpose of the present invention, the term "fluoropolymer comprising recurring units derived from vinylidene fluoride (VDF) [polymer (VDF)]" is understood to mean a fluoropolymer comprising recurring units derived from vinylidene fluoride and, optionally, recurring units derived from at least one fluorinated monomer different from vinylidene fluoride (VDF).

By the term "fluorinated monomer" it is hereby intended to denote an ethylenically unsaturated monomer comprising at least one fluorine atom.

The term "at least one fluorinated monomer" is understood to mean that the polymer (VDF) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

Non limitative examples of suitable fluorinated monomers include, notably, the followings:

$C_3$-$C_8$ perfluoroolefins such as tetrafluoroethylene (TFE) and hexafluoropropene (HFP);

$C_2$-$C_8$ hydrogenated fluoroolefins such as vinyl fluoride, 1,2-difluoroethylene and trifluoroethylene (TrFE);

perfluoroalkylethylenes of formula $CH_2=CH-R_{f0}$ wherein $R_{f0}$ is a $C_1$-$C_6$ perfluoroalkyl group;

chloro- and/or bromo- and/or iodo-$C_2$-$C_6$ fluoroolefins such as chlorotrifluoroethylene (CTFE);

(per)fluoroalkylvinylethers of formula $CF_2=CFOR_{f1}$ wherein $R_{f1}$ is a $C_1$-$C_6$ fluoro- or perfluoroalkyl group, e.g. $CF_3$, $C_2F_5$, $C_3F_7$;

$CF_2=CFOX_0$ (per)fluoro-oxyalkylvinylethers, wherein $X_0$ is a $C_1$-$C_{12}$ alkyl group, a $C_1$-$C_{12}$ oxyalkyl group or a $C_1$-$C_{12}$ (per)fluorooxyalkyl group comprising one or more ether groups, such as perfluoro-2-propoxy-propyl group;

(per)fluoroalkylvinylethers of formula $CF_2=CFOCF_2OR_{f2}$ wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group comprising one or more ether groups, such as $-C_2F_5-O-CF_3$;

functional (per)fluoro-oxyalkylvinylethers of formula $CF_2=CFOY_0$, wherein $Y_0$ is a $C_1$-$C_{12}$ alkyl or (per)fluoroalkyl group, a $C_1$-$C_{12}$ oxyalkyl group or a $C_1$-$C_{12}$ (per)fluorooxyalkyl group comprising one or more ether groups and $Y_0$ comprising a carboxylic or sulfonic acid group, in its acid, acid halide or salt form; and fluorodioxoles, preferably perfluorodioxoles.

The polymer (VDF) may further comprise at least one hydrogenated monomer.

By the term "hydrogenated monomer" it is hereby intended to denote an ethylenically unsaturated monomer comprising at least one hydrogen atom and free from fluorine atoms.

The term "at least one hydrogenated monomer" is understood to mean that the polymer (VDF) may comprise recurring units derived from one or more than one hydrogenated monomers. In the rest of the text, the expression "hydrogenated monomers" is understood, for the purposes of the present invention, both in the plural and the singular, that is to say that they denote both one or more than one hydrogenated monomers as defined above.

Non limitative examples of suitable hydrogenated monomers include, notably, non-fluorinated monomers such as ethylene, propylene, vinyl monomers such as vinyl acetate, (meth)acrylic monomers and styrene monomers such as styrene and p-methylstyrene.

The polymer (VDF) may be semi-crystalline or amorphous.

The term "semi-crystalline" is hereby intended to denote a polymer (VDF) having a heat of fusion of from 10 to 90 J/g, preferably of from 30 to 60 J/g, more preferably of from 35 to 55 J/g, as measured according to ASTM D3418-08.

The term "amorphous" is hereby intended to denote a polymer (VDF) having a heat of fusion of less than 5 J/g, preferably of less than 3 J/g, more preferably of less than 2 J/g as measured according to ASTM D-3418-08.

The polymer (VDF) is preferably semi-crystalline.

The polymer (VDF) preferably comprises:
(a) at least 60% by moles, preferably at least 75% by moles, more preferably at least 85% by moles of vinylidene fluoride (VDF), and
(b) optionally, from 0.1% to 15% by moles, preferably from 0.1% to 12% by moles, more preferably from 0.1% to 10% by moles of one or more fluorinated monomers selected from vinylfluoride ($VF_X$), chlorotrifluoroethylene (CTFE), hexafluoropropene (HFP), tetrafluoroethylene (TFE), trifluoroethylene (TrFE) and perfluoromethylvinylether (PMVE).

The polymer (VDF) may further comprise from 0.01% to 20% by moles, preferably from 0.05% to 18% by moles, more preferably from 0.1% to 10% by moles of at least one hydrogenated monomer selected from the group consisting of (meth)acrylic monomers.

The (meth)acrylic monomer preferably complies with formula (I):

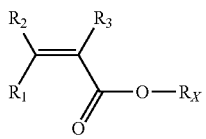

(I)

wherein:
$R_1$, $R_2$ and $R_3$, equal to or different from each other, are independently selected from a hydrogen atom and a $C_1$-$C_3$ hydrocarbon group, and
$R_X$ is a hydrogen atom or a $C_1$-$C_5$ hydrocarbon group comprising at least one hydroxyl group.

The term "at least one hydrogenated monomer selected from the group consisting of (meth)acrylic monomers" is understood to mean that the polymer (VDF) may comprise recurring units derived from one or more than one (meth)acrylic monomers as defined above. In the rest of the text, the expression "(meth)acrylic monomers" is understood, for the purposes of the present invention, both in the plural and the singular, that is to say that it denotes both one or more than one (meth)acrylic monomers as defined above.

Determination of average mole percentage of recurring units derived from (meth)acrylic monomers in the polymer (VDF) can be performed by any suitable method. Mention can be notably made of acid-base titration methods, well suited e.g. for the determination of the acrylic acid content, of NMR methods, adequate for the quantification of (meth)acrylic monomers comprising aliphatic hydrogen atoms in side chains, of weight balance based on total fed (meth)acrylic monomer and unreacted residual (meth)acrylic monomer during polymer (VDF) manufacture.

The (meth)acrylic monomer more preferably complies with formula (I-A) here below:

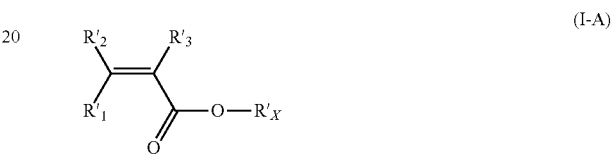

(I-A)

wherein:
$R'_1$, $R'_2$ and $R'_3$ are hydrogen atoms, and
$R'_X$ is a hydrogen atom or a $C_1$-$C_5$ hydrocarbon group comprising at least one hydroxyl group.

Non-limitative examples of suitable (meth)acrylic monomers of formula (I) as defined above include, notably, acrylic acid, methacrylic acid, hydroxyethyl(meth)acrylate, hydroxypropyl(meth)acrylate, hydroxyethylhexyl(meth)acrylate.

The polymer (VDF) is preferably a fluoropolymer consisting of recurring units derived from vinylidene fluoride (VDF) and, optionally, recurring units derived from at least one fluorinated monomer different from VDF.

For the purpose of the present invention, the term "continuous fibre" is understood to mean a single filament having a finite length.

The continuous fibre used in the process of the invention typically has a ratio of fibre length to fibre diameter between 200 and 500.

The continuous fibre used in the process of the invention typically has an average diameter comprised between 1 μm and 20 μm, preferably between 5 μm and 15 μm.

The continuous fibre used in the process of the invention is thus typically distinguishable from a discontinuous fibre, said discontinuous fibre typically having a ratio of fibre length to fibre diameter between 20 and 60.

The continuous fibre is preferably selected from the group consisting of:
glass fibres,
carbon fibres,
aramid fibres,
boron fibres,
silica fibres,
natural fibres such as linen, hemp or sisal, and
mixtures thereof.

The bunch of continuous fibres may be a roving, wherein the continuous fibres as defined above are parallel to each other, or a yarn, wherein the continuous fibres as defined above are twisted together.

The bunch of continuous fibre is preferably a roving.

The continuous fibre is preferably a continuous glass fibre or a continuous carbon fibre as defined above, more preferably a continuous glass fibre.

The roving preferably consists of glass continuous fibres as defined above.

For the purpose of the present invention, by "fabric" is understood to mean a planar textile structure obtainable by interlacing two or more sets of continuous fibres, rovings or yarns.

The fabric may be a woven fabric or a non-woven fabric.

By "woven fabric" it is intended to denote a planar textile structure obtainable by interlacing two or more sets of continuous fibres, rovings or yarns at right angles to each other thereby providing ends which run lengthwise in the fabric and picks which run crosswise in the fabric.

The ends and the picks of the woven fabric are typically comprised between 20/cm and 25/cm.

By "non-woven fabric" it is intended to denote a planar textile structure obtainable by interlocking or bonding mechanically, thermally or chemically continuous fibres, rovings or yarns.

The fabric may be a uni-directional fabric wherein the majority of the continuous fibers, rovings or yarns run in one direction.

The fabric may also be a multi-directional fabric wherein two or more sets of continuous fibers, rovings or yarns run in different directions.

The fabric is preferably obtainable by interlacing two or more sets of glass continuous fibres, rovings or yarns as defined above.

The fabric has typically a thickness comprised between 10 µm and 500 µm, preferably between 50 µm and 100 µm.

For the purpose of the present invention, by "aqueous latex" it is intended to denote a latex obtainable by an aqueous emulsion polymerization process.

Under step (i) of the process of the invention, the aqueous latex is advantageously obtainable by aqueous emulsion polymerization of vinylidene fluoride (VDF) and, optionally, at least one fluorinated monomer different from VDF in an aqueous medium, typically in the presence of at least one surfactant [surfactant (S)] and at least one initiator.

By the term "aqueous medium" it is intended to denote a medium comprising water.

The aqueous medium is preferably free from any organic solvents.

The aqueous latex of the process of the invention comprises at least one polymer (VDF) preferably under the form of primary particles having an average primary particle size comprised between 50 nm and 450 nm, preferably between 250 nm and 300 nm, as measured according to ISO 13321.

The aqueous latex of the process of the invention is thus to be intended distinguishable from an aqueous slurry prepared by dispersing polymer (VDF) powders in an aqueous medium. The average particle size of polymer (VDF) powders dispersed in an aqueous slurry is typically higher than 1 µm, as measured according to ISO 13321.

The aqueous latex of the process of the invention advantageously has homogeneously dispersed therein primary particles of at least one polymer (VDF) having an average primary particle size comprised between 50 nm and 450 nm, preferably between 250 nm and 300 nm, as measured according to ISO 13321.

For the purpose of the present invention, by "average primary particle size" it is intended to denote primary particles of polymer (VDF) deriving from an aqueous emulsion polymerization process. Primary particles of polymer (VDF) are thus to be intended distinguishable from agglomerates (i.e. collection of primary particles) which might be obtained by recovery and conditioning steps of polymer (VDF) manufacture such as concentration and/or coagulation of aqueous polymer (VDF) latexes and subsequent drying and homogenization to yield polymer (VDF) powders.

The aqueous emulsion polymerization process is typically carried out at a pressure comprised between 20 bar and 70 bar, preferably between 25 bar and 65 bar.

The skilled in the art will choose the polymerization temperature having regards, inter alia, of the initiator used. The aqueous emulsion polymerization temperature is typically carried out at a temperature comprised between 60° C. and 135° C., preferably between 90° C. and 130° C.

The surfactant (S) is typically selected from the group consisting of:

hydrogenated surfactants [surfactants (H)], fluorinated surfactants [surfactants (F)], and mixtures thereof.

The surfactant (H) is preferably selected from the group consisting of non-ionic surfactants [surfactant (NS)].

The surfactant (NS) is typically selected from the group consisting of fatty alcohol polyethers comprising recurring units derived from ethylene oxide and/or propylene oxide.

The surfactant (NS) preferably complies with formula (II) here below:

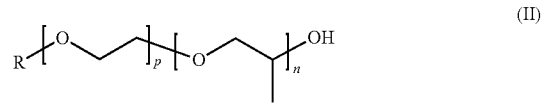

(II)

wherein R is a $C_8$-$C_{18}$ alkyl group, p and n, equal to or different from each other, can be zero or integers comprised between 6 and 18, with the proviso that at least one of p and n is different from zero. Preferably, the group R is selected from secondary $C_8$-$C_{18}$ alkyl groups, tertiary $C_8$-$C_{18}$ alkyl groups or mixtures thereof, that is to say from groups complying with (a) and/or (b) here below:

wherein $Ra_1$, $Ra_2$, $Rb_1$, $Rb_2$, $Rb_3$, equal to or different at each occurrence, are independently a linear or branched alkyl group comprising at least one carbon atom. Still more preferably, R is a secondary $C_8$-$C_{18}$ alkyl group, that is to say that it complies with formula (a) here above.

The surfactant (NS) more preferably complies with formula (III) here below:

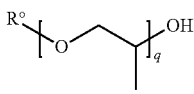

wherein R° is a $C_9$-$C_{15}$ alkyl group and q is an integer comprised between 7 and 12. Preferably, the group R° is selected from secondary $C_9$-$C_{15}$ alkyl groups, tertiary $C_9$-$C_{15}$ alkyl groups or mixtures thereof, that is to say from groups complying with (a) and/or (b) as defined above. Still more preferably, R° is a secondary $C_9$-$C_{15}$ alkyl group, that is to say that it complies with formula (a) here above.

The surfactant (NS) even more preferably complies with formula (IV) here below:

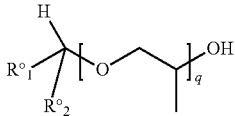

wherein q has the same meaning as above defined and each of $R°_1$ and $R°_2$, equal to or different from each other, is independently a $C_2$-$C_{12}$ alkyl group, preferably a $C_2$-$C_{12}$ branched alkyl group.

Surfactants (NS) complying with formula (IV) here above are notably derived from secondary fatty alcohols; surfactants of formula (IV) comprising a secondary alkyl group are particularly useful for the purpose of the invention as they advantageously confer to the aqueous latex and to the up-concentrated aqueous latex increased shear stability at a given ethylene oxide content.

The surfactant (NS) has generally a cloud point of advantageously 50° C. or more, preferably of 55° C. or more, as measured according to EN 1890 standard (method A: 1% by weight water solution).

A surfactant (NS) which gave very good results in the process of the invention is the MARLOSOL® TA 3090 non-ionic surfactant, commercially available from Sasol Olefins and Surfactants GmbH, having a cloud point of 59° C. and a HLB of 13.3.

For the avoidance of doubt, by the term "HLB" it is meant the hydrophilic-lipophilic balance (HLB) which can be determined using the Water-Solubility Method, "The HLB System," ICI Americas, Inc., 1992.

The surfactant (F) preferably complies with formula (V) here below:

$$R_{fs}(X^-)_k(M^+)_k \quad (V)$$

wherein:
$R_{fS}$ is selected from a $C_4$-$C_{16}$ (per)fluoroalkyl chain, optionally comprising one or more catenary or non-catenary oxygen atoms, and a (per)fluoropolyoxyalkyl chain,
$X^-$ is selected from —COO$^-$, —PO$_3^-$ and —SO$_3^-$,
$M^+$ is selected from NH$_4^+$ and an alkaline metal ion, and k is 1 or 2.

Non-limitative examples of surfactants (F) suitable for the aqueous emulsion polymerization process include, notably, the followings:
(a') $CF_3(CF_2)_{n0}COOM'$, wherein $n_0$ is an integer ranging from 4 to 10, preferably from 5 to 7, preferably $n_0$ being equal to 6, and M' represents NH$_4$, Na, Li or K, preferably NH$_4$;

(b') $T-(C_3F_6O)_{n1}(CFYO)_{m1}CF_2COOM''$, wherein T represents a Cl atom or a perfluoroalkoxyde group of formula $C_xF_{2x+1-x'}Cl_{x'}O$, wherein x is an integer ranging from 1 to 3 and x' is 0 or 1, $n_1$ is an integer ranging from 1 to 6, $m_1$ is 0 or an integer ranging from 1 to 6, M'' represents NH$_4$, Na, Li or K and Y represents F or —CF$_3$;

(c') $F—(CF_2CF_2)_{n2}—CH_2—CH_2—X*O_3M'''$, wherein X* is a phosphorus or a sulphur atom, preferably X* being a sulphur atom, M''' represents NH$_4$, Na, Li or K and $n_2$ is an integer ranging from 2 to 5, preferably $n_2$ being equal to 3;

(d') A-$R_{bf}$-B bifunctional fluorinated surfactants, wherein A and B, equal to or different from each other, have formula —(O)$_p$CFY''—COOM*, wherein M* represents NH$_4$, Na, Li or K, preferably M* representing NH$_4$, Y'' is F or —CF$_3$ and p is 0 or 1, and $R_{bf}$ is a divalent (per)fluoroalkyl chain or (per)fluoropolyether chain such that the number average molecular weight of A-$R_{bf}$-B is in the range of from 300 to 1800; and (e') mixtures thereof.

Preferred surfactants (F) comply with formula (a') as described above.

While the choice of the initiator is not particularly limited, it is understood that water-soluble initiators suitable for aqueous emulsion polymerization are selected from compounds capable of initiating and/or accelerating the polymerization process.

Inorganic radical initiators may be used and include, but are not limited to, persulfates such as sodium, potassium and ammonium persulfates, permanganates such as potassium permanganate.

Also, organic radical initiators may be used and include, but are not limited to, the followings: acetylcyclohexane-sulfonyl peroxide; diacetylperoxydicarbonate; dialkylperoxydicarbonates such as diethylperoxydicarbonate, dicyclohexylperoxydicarbonate, di-2-ethylhexylperoxydicarbonate; tert-butylperneodecanoate; 2,2'-azobis(4-methoxy-2,4-dimethylvaleronitrile; tert-butylperpivalate; dioctanoylperoxide; dilauroyl-peroxide; 2,2'-azobis (2,4-dimethylvaleronitrile); tert-butylazo-2-cyanobutane; dibenzoylperoxide; tert-butyl-per-2ethylhexanoate; tert-butylpermaleate; 2,2'-azobis (isobutyronitrile); bis(tert-butylperoxy)cyclohexane; tert-butyl-peroxyisopropylcarbonate; tert-butylperacetate; 2,2'-bis (tert-butylperoxy)butane; dicumyl peroxide; di-tert-amyl peroxide; di-tert-butyl peroxide (DTBP); p-methane hydroperoxide; pinane hydroperoxide; cumene hydroperoxide; and tert-butyl hydroperoxide.

Other suitable initiators notably include halogenated free radical initiators such as chlorocarbon based and fluorocarbon based acyl peroxides such as trichloroacetyl peroxide, bis(perfluoro-2-propoxy propionyl) peroxide, [CF$_3$CF$_2$CF$_2$OCF(CF$_3$)COO]$_2$, perfluoropropionyl peroxides, (CF$_3$CF$_2$CF$_2$COO)$_2$, (CF$_3$CF$_2$COO)$_2$, {(CF$_3$CF$_2$CF$_2$)—[CF(CF$_3$)CF$_2$O]$_m$—CF(CF$_3$)—COO}$_2$ where m=0-8, [ClCF$_2$(CF$_2$)$_n$COO]$_2$, and [HCF$_2$(CF$_2$)$_n$COO]$_2$ where n=0-8; perfluoroalkyl azo compounds such as perfluoroazoisopropane, [(CF$_3$)$_2$CFN=]$_2$, $R^\alpha$N=N $R^\alpha$, where $R^\alpha$ is a linear or branched perfluorocarbon group having 1-8 carbons; stable or hindered perfluoroalkane radicals such as hexafluoropropylene trimer radical, [(CF$_3$)$_2$CF]$_2$(CF$_2$CF$_2$)C• radical and perfluoroalkanes.

Redox systems, comprising at least two components forming a redox couple, such as dimethylaniline-benzoyl peroxide, diethylaniline-benzoyl peroxide and diphenylamine-benzoyl peroxide may also be used as initiators to initiate the polymerization process.

Among inorganic radical initiators, ammonium persulfate is particularly preferred.

Among organic radical initiators, the peroxides having a self-accelerating decomposition temperature (SADT) higher than 50° C. are particularly preferred, such as for instance: di-tert-butyl peroxide (DTBP), diterbutylperoxyisopropylcarbonate, terbutyl(2-ethyl-hexyl)peroxycarbonate, terbutylperoxy-3,5,5-trimethylhexanoate.

One or more initiators as defined above may be added to the aqueous medium of the aqueous emulsion polymerization process in an amount ranging advantageously from 0.001% to 20% by weight based on the weight of the aqueous medium.

The aqueous emulsion polymerization process may be carried out in the presence of at least one non-functional perfluoropolyether (PFPE) oil.

By "non-functional perfluoropolyether (PFPE) oil" it is hereby intended to denote a perfluoropolyether (PFPE) oil comprising a (per)fluoropolyoxyalkylene chain [chain ($R_f$)] and non-functional end-groups.

The non-functional end groups of the PFPE oil are generally selected from fluoro(halo)alkyl groups having 1 to 3 carbon atoms, optionally comprising one or more halogen atoms different from fluorine or hydrogen atoms, e.g. $CF_3$—, $C_2F_5$—, $C_3F_6$—, $ClCF_2CF(CF_3)$—, $CF_3CFClCF_2$—, $ClCF_2CF_2$—, $ClCF_2$—.

The non-functional PFPE oil has a number average molecular weight advantageously comprised between 400 and 3000, preferably between 600 and 1500.

The non-functional PFPE oil is preferably selected from the group consisting of:

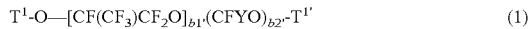   (1)

wherein:
   $T^1$ and $T^{1\prime}$, equal to or different from each other, are independently selected from —$CF_3$, —$C_2F_5$ and —$C_3F_7$ groups;
   Y, equal or different at each occurrence, is selected from a fluorine atom and a —$CF_3$ group;
   b1' and b2', equal to or different from each other, are independently integers≥0 such that the b1'/b2' ratio is comprised between 20 and 1000 and the (b1'+b2') sum is comprised between 5 and 250; should b1' and b2' be both different from zero, the different recurring units are generally statistically distributed along the perfluoropolyoxyalkylene chain. Said products can be obtained by photooxidation of $C_3F_6$ as described in CA 786877 (MONTEDISON S.P.A.) Jun. 4, 1968 and by subsequent conversion of the end groups as described in GB 1226566 (MONTECATINI EDISON S.P.A.) Mar. 31, 1971.

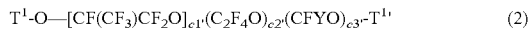   (2)

wherein:
   $T^1$ and $T^{1\prime}$, equal to or different from each other, have the same meaning as defined above;
   Y, equal or different at each occurrence, has the same meaning as defined above;
   c1', c2' and c3', equal to or different from each other, are independently integers≥0 such that the (c1'+c2'+c3') sum is comprised between 5 and 250; should at least two of c1', c2' and c3' be different from zero, the different recurring units are generally statistically distributed along the perfluoropolyoxyalkylene chain.
   Said products can be manufactured by photooxidation of a mixture of $C_3F_6$ and $C_2F_4$ and subsequent treatment with fluorine as described in U.S. Pat. No. 3,665,041 (MONTECATINI EDISON S.P.A.) May 23, 1972.

   (3)

wherein:
   $T^1$ and $T^{1\prime}$, equal to or different from each other, have the same meaning as defined above;
   d1' and d2', equal to or different from each other, are independently integers≥0 such that the d1'/d2' ratio is comprised between 0.1 and 5 and the (d1'+d2') sum is comprised between 5 and 250; should d1' and d2' be both different from zero, the different recurring units are generally statistically distributed along the perfluoropolyoxyalkylene chain.
   Said products can be produced by photooxidation of $C_2F_4$ as reported in U.S. Pat. No. 3,715,378 (MONTECATINI EDISON S.P.A.) Feb. 6, 1973 and subsequent treatment with fluorine as described in U.S. Pat. No. 3,665,041 (MONTECATINI EDISON S.P.A.) May 23, 1972.

   (4)

wherein:
   $T^2$ and $T^{2\prime}$, equal to or different from each other, are independently selected from —$C_2F_5$ and —$C_3F_7$ groups;
   e' is an integer comprised between 5 and 250.
   Said products can be prepared by ionic hexafluoropropylene epoxide oligomerization and subsequent treatment with fluorine as described in U.S. Pat. No. 3,242,218 (E. I. DU PONT DE NEMOURS AND CO.) Mar. 22, 1966.

   (5)

wherein:
   $T^2$ and $T^{2\prime}$, equal to or different from each other, have the same meaning as defined above;
   f' is an integer comprised between 5 and 250.
   Said products can be obtained by a method comprising fluorinating a polyethyleneoxide, e.g. with elemental fluorine, and optionally thermally fragmentating the so-obtained fluorinated polyethyleneoxide as reported in U.S. Pat. No. 4,523,039 (THE UNIVERSITY OF TEXAS) Nov. 6, 1985.

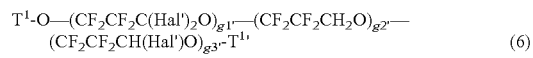   (6)

wherein:
   $T^1$ and $T^{1\prime}$, equal to or different from each other, have the same meaning as defined above;
   Hal', equal or different at each occurrence, is a halogen selected from fluorine and chlorine atoms, preferably a fluorine atom;
   g1', g2', and g3', equal to or different from each other, are independently integers≥0 such that the (g1'+g2'+g3') sum is comprised between 5 and 250; should at least two of g1', g2' and g3' be different from zero, the different recurring units are generally statistically distributed along the (per)fluoropolyoxyalkylene chain.
   Said products may be prepared by ring-opening polymerizing 2,2,3,3-tetrafluorooxethane in the presence of a polymerization initiator to give a polyether comprising repeating units of the formula: —$CH_2CF_2CF_2O$—, and optionally fluorinating and/or chlorinating said polyether, as detailed in EP 148482 A (DAIKIN INDUSTRIES LTD.) Mar. 25, 1992.

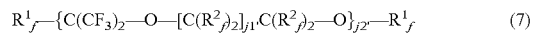   (7)

wherein:
   $R^1_f$, equal or different at each occurrence, is a $C_1$-$C_6$ perfluoroalkyl group;

$R^2_f$, equal or different at each occurrence, is selected from a fluorine atom and a $C_1$-$C_6$ perfluoroalkyl group;

j1' is equal to 1 or 2;

j2' is an integer comprised between 5 and 250.

Said products can be produced by the copolymerization of hexafluoroacetone with an oxygen-containing cyclic comonomer selected from ethylene oxide, propylene oxide, epoxy-butane and/or trimethylene oxide (oxethane) or substituted derivatives thereof and subsequent perfluorination of the resulting copolymer, as detailed in patent application WO 87/00538 (LAGOW ET AL.) Jan. 29, 1987.

The non-functional PFPE oil is more preferably selected from the group consisting of:

(1') non-functional PFPE oils commercially available from Solvay Solexis S.p.A. under the trademark names GALDEN® and FOMBLIN®, said PFPE oils generally comprising at least one PFPE oil complying with either of formulae here below:

$$CF_3-[(OCF_2CF_2)_m-(OCF_2)_n]-OCF_3$$

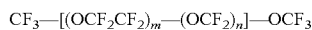

$m+n=40-180; m/n=0.5-2$ $$CF_3-[(OCF(CF_3)CF_2)_p-(OCF_2)_q]-OCF_3$$

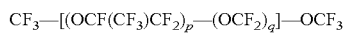

$p+q=8-45; p/q=20-1000$ (2') non-functional PFPE oils commercially available from Daikin under the trademark name DEMNUM®, said PFPEs generally comprising at least one PFPE complying with formula here below:

$$F-(CF_2CF_2CF_2O)_n-(CF_2CF_2CH_2O)_j-CF_2CF_3$$

$j=0$ or integer>0; $n+j=10-150$ (3') non-functional PFPE oils commercially available from Du Pont de Nemours under the trademark name KRYTOX®, said PFPEs generally comprising at least one low-molecular weight, fluorine end-capped, homopolymer of hexafluoropropylene epoxide complying with formula here below:

$$F-(CF(CF_3)CF_2O)_n-CF_2CF_3$$

$n=10-60$

The non-functional PFPE oil is even more preferably selected from those having formula (1') as described above.

The aqueous emulsion polymerization process as detailed above is typically carried out in the presence of a chain transfer agent. The chain transfer agent is generally selected from those known in the polymerization of fluorinated monomers such as ketones, esters, ethers or aliphatic alcohols having from 3 to 10 carbon atoms like, e.g., acetone, ethylacetate, diethylether, methyl-ter-butyl ether, isopropyl alcohol; chloro(fluoro)carbons, optionally containing hydrogen, having from 1 to 6 carbon atoms, like, e.g., chloroform, trichlorofluoromethane; bis(alkyl)carbonates wherein the alkyl has from 1 to 5 carbon atoms like, e.g., bis(ethyl) carbonate, bis(isobutyl)carbonate. The chain transfer agent may be fed to the aqueous medium at the beginning, continuously or in discrete amounts (step-wise) during the polymerization, continuous or stepwise feeding being preferred.

Aqueous emulsion polymerization processes as detailed above have been described in the art (see e.g. U.S. Pat. No. 4,990,283 (AUSIMONT S.P.A.) Feb. 5, 1991, U.S. Pat. No. 5,498,680 (AUSIMONT S.P.A.) Mar. 12, 1996 and U.S. Pat. No. 6,103,843 (AUSIMONT S.P.A.) Aug. 15, 2000).

The aqueous latex of the process of the invention preferably comprises from 20% and 30% by weight of at least one polymer (VDF).

The aqueous latex of the process of the invention is typically up-concentrated according to any techniques known in the art.

The up-concentrated aqueous latex of the process of the invention advantageously has homogeneously dispersed therein primary particles of at least one polymer (VDF) having an average primary particle size comprised between 50 nm and 450 nm, preferably between 250 nm and 300 nm, as measured according to ISO 13321.

It has been found that, according to the process of the invention, by contacting the continuous fibres or a bunch of continuous fibres with the up-concentrated aqueous latex comprising from 45% to 60% by weight, preferably from 45% to 55% by weight of at least one polymer (VDF), which leads to a substantially uniform distribution of the polymer (VDF) throughout the continuous fibrous structure, a fluoropolymer composite having advantageously an outstanding structural integrity is obtained.

It has been also found that, by using the up-concentrated aqueous latex comprising from 45% to 60% by weight, preferably from 45% to 55% by weight of at least one polymer (VDF), the process of the invention advantageously provides for a fluoropolymer composite tape having a relatively high thickness at a relatively low number of coating steps.

On the other hand, an up-concentrated aqueous latex comprising more than 60% by weight of at least one polymer (VDF) is not homogeneously dispersed and does not lead to a substantially uniform distribution of the polymer (VDF) throughout the continuous fibrous structure or the fabric structure.

The aqueous latex of the process of the invention may be up-concentrated by addition of a non-ionic surfactant [surfactant (NS)] and subsequent heating above the cloud point of the above-mentioned non-ionic surfactant so as to separate the supernatant water phase from the polymer (VDF)-rich phase.

Otherwise, the aqueous latex of the process of the invention may be up-concentrated by ultra-filtration filtering the aqueous latex through selective semi-permeable membranes, which enable separation of an up-concentrated latex from a fraction of the liquid phase.

Should the polymer (VDF) polymerization process take place in the presence of at least one fluorinated surfactant [surfactant (F)], the aqueous latex is preferably purified from said surfactant(s) (F), either before or after up-concentration.

Purification from surfactant(s) (F) can be carried out according to known techniques, including generally phase separation and/or ion exchange treatments, such as those described in EP 1489104 A (ASAHI GLASS CO. LTD.) Dec. 22, 2004, EP 1574527 A (DAIKIN IND. LTD.) Sep. 14, 2005, WO 2005/003190 (DAIKIN IND. LTD.) Jan. 13, 2005, U.S. Pat. No. 6,833,403 (3M INNOVATIVE PROPERTIES CO.) Dec. 21, 2004, EP 1584632 A (SOLVAY SOLEXIS S.P.A.) Oct. 12, 2005, WO 2007/116037 (SOLVAY SOLEXIS S.P.A.) Oct. 18, 2007.

Very good results have been obtained using an up-concentrated aqueous latex comprising from 45% to 55% by weight of at least one polymer (VDF).

The up-concentrated aqueous latex of the process of the invention typically further comprises from 1% to 5% by weight, preferably from 1.5% to 3.5% by weight of at least one non-ionic surfactant [surfactant (NS)], based on the total weight of the up-concentrated aqueous latex.

The up-concentrated aqueous latex of the process of the invention is preferably free from surfactants (F) or it comprises at least one surfactant (F) in an amount of advantageously less than 10 ppm, preferably less than 5 ppm, more preferably less than 1 ppm, based on the total weight of the polymer (VDF).

The aqueous latex of the process of the invention may also further comprises one or more additives selected from the group consisting of film forming agents such as acrylic dispersions, coalescing agents, pH adjusters and biocides.

Should one or more additives as defined above be present, the up-concentrated aqueous latex of the process of the invention typically comprises up to 30%, preferably from 1.5% to 25% by weight of one or more additives as defined above, based on the total weight of the up-concentrated aqueous latex.

Under step (iii) of the process of the invention, one continuous fibre or a bunch of continuous fibres are typically dipped into a bath of the up-concentrated aqueous latex.

Under step (iii) of the process of the invention, a fabric is typically dipped into a bath of the up-concentrated aqueous latex.

Step (iii) of the process of the invention is preferably carried out at a temperature of about 20° C.

Under step (iv) of the process of the invention, the impregnated fibrous material or the impregnated fabric is squeezed typically using two static rolls, between which the impregnated fibrous material or the impregnated fabric is forced to pass.

The process of the invention is advantageously free from any precipitation steps of the polymer (VDF) from the up-concentrated aqueous latex after squeezing the impregnated fibrous material or the impregnated fabric under step (iv).

Under step (v) of the process of the invention, the squeezed fibrous material or the squeezed fabric is dried, typically through a drier, typically at a temperature comprised between 100° C. and 120° C.

Under step (vi) of the process of the invention, the dried fibrous material or the dried fabric is baked, typically through a baking oven, at a temperature comprised between 190° C. and 240° C.

Under step (vi) of the process of the invention, the dried fibrous material or the dried fabric is baked at a temperature comprised between 190° C. and 240° C. for a time advantageously comprised between 30 seconds and 10 minutes.

According to a preferred embodiment of the process of the invention, as sketched in FIG. 1, a fabric (1) is dipped into a bath of the up-concentrated aqueous latex (2) so as to obtain an impregnated fabric (3), which is squeezed (4), generally using two static rolls (4a and 4b), between which the impregnated fabric is forced to pass, so that excess of the up-concentrated aqueous latex is bled away and falls by gravity into the bath (2). The squeezed fabric is then made to pass through a drier (5), typically operating at a temperature comprised between 100° C. and 120° C., and then through a baking oven operating at a temperature comprised between 190° C. and 240° C. The so-obtained coated fabric (7) is typically collected by rolling around a roll and submitted to one or more further coating steps, if required.

The fluoropolymer composite tape obtainable by the process of the invention is advantageously suitable for use in oil and gas applications.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

Glass fabric FEF Y 0336 obtained from Fothergill Engineered Fabrics. The woven glass fabric (Glass EC5/11/2) has a plain weave construction with an end of 23.6/cm and a pick of 22.8/cm, a thickness of 0.08 mm and a weight of 105 g/cm$^2$.

MARLOSOL® TA 3090 non-ionic surfactant is a $C_{13}$-alcohol polyethylene glycol ether with about 9 ethylene oxide units, having a cloud point of 59° C. and a HLB of 13.3.

Manufacture of VDF Homopolymer Aqueous Latex

A VDF homopolymer aqueous latex having a solid content of 21.4% by weight was obtained using the procedure as described in Example 1 of U.S. Pat. No. 7,122,608 (SOLVAY SOLEXIS S.P.A.) Oct. 17, 2006.

EXAMPLE 1

MARLOSOL® TA 3090 non-ionic surfactant was added to the VDF homopolymer aqueous latex in an amount of about 5% by weight based on the weight of the VDF homopolymer.

The stabilized aqueous latex was circulated via a peristaltic pump through an ultra-filtration unit composed of a bundle of tubular ultra-filtration filters, wherein the liquid aqueous phase was removed until a solid content of 54.3% by weight was reached with 2% by weight of residual MARLOSOL® TA 3090 non-ionic surfactant.

The woven glass fabric was immersed in the VDF homopolymer up-concentrated aqueous latex with a speed of 1.5 m/min. The woven glass fabric was then passed through two static rolls so as to remove the excess of the up-concentrated aqueous latex.

The woven glass fabric so impregnated was subsequently dried at 100° C. and finally baked at 240° C.

The coating process was repeated 6 times.

The overall thickness of the coating on the so coated fabric was around 40-45 μm (after 6 coating steps). For each coating step, a thickness of the coating ranging from about 5 μm to about 15 μm was advantageously achieved.

COMPARATIVE EXAMPLE 1

The same procedure under Example 1 was followed but using a VDF homopolymer aqueous latex manufactured via emulsion polymerization with a solid content of 22.35% by weight, without up-concentration by ultra-filtration of the aqueous latex thereby provided.

The overall thickness of the coating on the so coated fabric was around 10-15 μm (after 6 coating steps). For each coating step, a thickness of the coating of about 2-3 μm was achieved.

It has been thus found that, according to the process of the invention, a fluoropolymer composite having high structural integrity and high adhesion at the fibre-fluoropolymer interface is advantageously obtained at a baking temperature advantageously comprised between 190° C. and 240° C., thus avoiding degradation of the polymer (VDF) in the fluoropolymer composite thereby provided.

The fluoropolymer composite tape obtainable by the process of the invention is also advantageously endowed with a coating having a relatively high thickness in a one-step coating process.

BRIEF DESCRIPTION OF DRAWINGS

FIG. 1 discloses an apparatus specifically designed to carry out the process of the invention, wherein a fabric (1) is dipped into a bath of the up-concentrated aqueous latex (2) so as to obtain an impregnated fabric (3), which is squeezed (4), generally using two static rolls (4a and 4b), between which the impregnated fabric is forced to pass, so that excess of the aqueous latex is bled away and falls by gravity into the bath (2). The squeezed fabric is then made to pass through a drier (5), typically operating at a temperature comprised between 100° C. and 120° C., and then through a baking oven operating at a temperature comprised between 190° C. and 240° C. The so-obtained coated fabric (7) is typically collected by rolling around a roll and submitted to one or more further coating steps, if required.

The invention claimed is:

1. A process for manufacturing a fluoropolymer composite, said process comprising:
   (i) up-concentrating an aqueous latex comprising from 10% to 40% by weight of at least one fluoropolymer comprising recurring units derived from vinylidene fluoride (VDF) [polymer (VDF)] thereby providing an up-concentrated aqueous latex comprising from 45% to 60% by weight of at least one polymer (VDF);
   (ii) contacting one continuous fibre or a bunch of continuous fibres with the up-concentrated aqueous latex thereby forming an impregnated fibrous material;
   (iii) squeezing the impregnated fibrous material thereby forming a squeezed fibrous material;
   (iv) drying the squeezed fibrous material thereby forming a dried fibrous material;
   (v) baking the dried fibrous material at a temperature comprised between 190° C. and 240° C. thereby forming a coated fibrous material;
   (vi) cooling the coated fibrous material thereby forming a cooled coated fibrous material;
   (vii) optionally, contacting the cooled coated fibrous material with additional up-concentrated aqueous latex and submitting the impregnated fibrous material so provided to sequential steps (iii) to (vi); and
   (viii) optionally, repeating step (vii) one or more times.

2. The process according to claim 1, wherein polymer (VDF) comprises recurring units derived from vinylidene fluoride (VDF) and, optionally, recurring units derived from at least one fluorinated monomer different from VDF.

3. The process according to claim 1, wherein polymer (VDF) further comprises from 0.01% to 20% by moles of at least one hydrogenated monomer selected from the group consisting of (meth)acrylic monomers.

4. The process according to claim 1, wherein the aqueous latex, prior to up-concentrating, is obtainable by aqueous emulsion polymerization of vinylidene fluoride (VDF) and, optionally, at least one fluorinated monomer different from VDF in an aqueous medium in the presence of at least one surfactant (S) and at least one initiator.

5. The process according to claim 4, wherein the aqueous emulsion polymerization is carried out in the presence of at least one non-functional perfluoropolyether (PFPE) oil.

6. The process according to claim 1, wherein the up-concentrated aqueous latex further comprises from 1% to 5% by weight of at least one non-ionic surfactant (NS), based on the total weight of the up-concentrated aqueous latex.

7. The process according to claim 1, wherein the continuous fibre has an average diameter comprised between 1 μm and 20 μm.

8. The process according to claim 1, wherein the bunch of continuous fibres is a roving or a yarn.

9. A process for manufacturing a fluoropolymer composite tape, said process comprising:
   (i) up-concentrating an aqueous latex comprising from 10% to 40% by weight of at least one fluoropolymer comprising recurring units derived from vinylidene fluoride (VDF) [polymer (VDF)] thereby providing an up-concentrated aqueous latex comprising from 45% to 60% by weight of at least one polymer (VDF);
   (ii) contacting a fabric with the up-concentrated aqueous latex thereby forming an impregnated fabric;
   (iii) squeezing the impregnated fabric thereby forming a squeezed fabric;
   (iv) drying the squeezed fabric thereby forming a dried fabric;
   (v) baking the dried fabric at a temperature comprised between 190° C. and 240° C. thereby forming a coated fabric;
   (vi) cooling the coated fabric thereby forming a cooled coated fabric;
   (vii) optionally, contacting the cooled coated fabric with additional up-concentrated aqueous latex and submitting the impregnated fabric so provided to sequential steps (iii) to (vi);
   (viii) optionally, repeating step (vii) one or more times; and
   (ix) collecting by rolling the coated fabric provided in any one of steps (vi) to (viii).

10. The process according to claim 9, wherein the fabric is a woven fabric or a non-woven fabric.

11. The process according to claim 9, wherein the fabric is a uni-directional fabric or a multi-directional fabric.

12. The process according to claim 9, wherein the fabric is obtainable by interlacing two or more sets of glass continuous fibres, rovings or yarns.

13. A fluoropolymer composite obtainable by the process of claim 1.

14. A fluoropolymer composite tape obtainable by the process of claim 9.

15. The process according to claim 9, wherein polymer (VDF) comprises recurring units derived from vinylidene fluoride (VDF) and, optionally, recurring units derived from at least one fluorinated monomer different from VDF.

16. The process according to claim 9, wherein polymer (VDF) further comprises from 0.01% to 20% by moles of at least one hydrogenated monomer selected from the group consisting of (meth)acrylic monomers.

17. The process according to claim 9, wherein the aqueous latex, prior to up-concentrating, is obtainable by aqueous emulsion polymerization of vinylidene fluoride (VDF) and, optionally, at least one fluorinated monomer different from VDF in an aqueous medium in the presence of at least one surfactant (S) and at least one initiator.

18. The process according to claim 17, wherein the aqueous emulsion polymerization is carried out in the presence of at least one non-functional perfluoropolyether (PFPE) oil.

19. The process according to claim 9, wherein the up-concentrated aqueous latex further comprises from 1% to 5% by weight of at least one non-ionic surfactant (NS), based on the total weight of the up-concentrated aqueous latex.

\* \* \* \* \*